(12) United States Patent
Tran (10) Patent No.: US 10,628,320 B2
(45) Date of Patent: Apr. 21, 2020

(54) MODULIZATION OF CACHE STRUCTURE UTILIZING INDEPENDENT TAG ARRAY AND DATA ARRAY IN MICROPROCESSOR

(71) Applicant: Synopsys, Inc., Mountain View, CA (US)

(72) Inventor: Thang Tran, Saratoga, CA (US)

(73) Assignee: Synopsys, Inc., Mountain View, CA (US)

(*) Notice: Subject to any disclaimer, the term of this patent is extended or adjusted under 35 U.S.C. 154(b) by 64 days.

(21) Appl. No.: 15/172,906

(22) Filed: Jun. 3, 2016

(65) Prior Publication Data
US 2017/0351610 A1 Dec. 7, 2017

(51) Int. Cl.
*G06F 12/0875* (2016.01)
*G06F 12/084* (2016.01)
*G06F 12/0895* (2016.01)

(52) U.S. Cl.
CPC ........ *G06F 12/0875* (2013.01); *G06F 12/084* (2013.01); *G06F 12/0895* (2013.01); *G06F 2212/452* (2013.01); *G06F 2212/60* (2013.01); *G06F 2212/621* (2013.01); *Y02D 10/13* (2018.01)

(58) Field of Classification Search
CPC .............. G06F 12/0815; G06F 12/084; G06F 12/0875; G06F 2212/452; G06F 2212/60; G06F 2212/621
See application file for complete search history.

(56) References Cited

U.S. PATENT DOCUMENTS

| | | | | |
|---|---|---|---|---|
| 5,274,790 A | * | 12/1993 | Suzuki | G06F 12/0853 711/131 |
| 5,333,284 A | | 7/1994 | Nugent | |
| 5,463,745 A | | 10/1995 | Vidwans et al. | |
| 5,471,591 A | * | 11/1995 | Edmondson | G06F 9/3836 711/E12.024 |
| 5,519,864 A | | 5/1996 | Martell et al. | |
| 5,584,038 A | | 12/1996 | Papworth et al. | |

(Continued)

OTHER PUBLICATIONS

Pandey, R., Lecture Notes—"Process and Thread Scheduling," Department of Computer Sciences, University of California, Davis, Winter 2005 (Year: 2005).

(Continued)

*Primary Examiner* — Mano Padmanabhan
*Assistant Examiner* — Andrew J Cheong
(74) *Attorney, Agent, or Firm* — Fenwick & West LLP (57) ABSTRACT

Embodiments of the present disclosure support implementation of a Level-1 (L1) cache in a microprocessor based on independently accessed data and tag arrays. Presented implementations of L1 cache do not require any stall pipeline mechanism for stalling execution of instructions, leading to improved microprocessor performance. A data array in the cache is interfaced with one or more data index queues that comprise, upon occurrence of a conflict between at least one instruction requesting access to the data array and at least one other instruction that accessed the data array, at least one data index for accessing the data array associated with the at least one instruction. A tag array in the cache is interfaced with a tag queue that stores one or more tag entries associated with one or more data outputs read from the data array based on accessing the data array.

19 Claims, 7 Drawing Sheets

(56) References Cited

U.S. PATENT DOCUMENTS

| | | | |
|---|---|---|---|
| 5,675,758 A | 10/1997 | Sowadsky et al. | |
| 5,684,971 A | 11/1997 | Martell et al. | |
| 5,761,476 A | 6/1998 | Martell | |
| 5,948,098 A | 9/1999 | Leung et al. | |
| 5,987,620 A | 11/1999 | Tran | |
| 6,076,145 A * | 6/2000 | Iwata | G06F 9/3802 711/125 |
| 6,108,769 A | 8/2000 | Chinnakonda et al. | |
| 6,112,019 A | 8/2000 | Chamdani et al. | |
| 6,205,543 B1 | 3/2001 | Tremblay et al. | |
| 6,233,599 B1 | 5/2001 | Nation et al. | |
| 6,247,094 B1 * | 6/2001 | Kumar | G06F 12/0862 711/118 |
| 6,272,520 B1 | 8/2001 | Sharangpani et al. | |
| 6,341,301 B1 * | 1/2002 | Hagan | G06F 9/461 718/100 |
| 6,408,325 B1 | 6/2002 | Shaylor | |
| 6,425,072 B1 | 7/2002 | Meier et al. | |
| 6,557,078 B1 * | 4/2003 | Mulla | G06F 12/0855 711/122 |
| 6,697,939 B1 * | 2/2004 | Kahle | G06F 9/30174 712/240 |
| 6,785,803 B1 * | 8/2004 | Merchant | G06F 9/383 712/219 |
| 7,143,243 B2 * | 11/2006 | Miller | G06F 12/0882 711/118 |
| 7,434,032 B1 | 10/2008 | Coon et al. | |
| 7,610,473 B2 | 10/2009 | Kissell | |
| 7,644,221 B1 * | 1/2010 | Chan | G06F 13/387 710/306 |
| 9,348,595 B1 | 5/2016 | Mizrahi et al. | |
| 2001/0056456 A1 | 12/2001 | Cota-Robles | |
| 2002/0083304 A1 | 6/2002 | Leenstra et al. | |
| 2003/0005263 A1 | 1/2003 | Eickemeyer et al. | |
| 2003/0005266 A1 | 1/2003 | Akkary et al. | |
| 2003/0033509 A1 | 2/2003 | Leibholz et al. | |
| 2003/0061467 A1 | 3/2003 | Yeh et al. | |
| 2004/0015684 A1 | 1/2004 | Peterson | |
| 2004/0139306 A1 | 7/2004 | Albuz et al. | |
| 2004/0172523 A1 | 9/2004 | Merchant et al. | |
| 2004/0243764 A1 * | 12/2004 | Miller | G06F 12/0882 711/118 |
| 2005/0044327 A1 * | 2/2005 | Howard | G06F 9/544 711/147 |
| 2005/0125802 A1 * | 6/2005 | Wang | G06F 9/3009 718/108 |
| 2005/0149936 A1 | 7/2005 | Pilkington | |
| 2005/0273580 A1 | 12/2005 | Chaudhry et al. | |
| 2006/0117316 A1 | 6/2006 | Cismas et al. | |
| 2007/0136562 A1 | 6/2007 | Caprioli et al. | |
| 2007/0204137 A1 * | 8/2007 | Tran | G06F 9/30181 712/214 |
| 2007/0266387 A1 | 11/2007 | Henmi | |
| 2008/0082755 A1 * | 4/2008 | Kornegay | G06F 12/0855 711/141 |
| 2008/0295105 A1 | 11/2008 | Ozer et al. | |
| 2009/0037698 A1 | 2/2009 | Nguyen | |
| 2010/0031268 A1 | 2/2010 | Dwyer et al. | |
| 2010/0082945 A1 | 4/2010 | Adachi et al. | |
| 2010/0083267 A1 | 4/2010 | Adachi et al. | |
| 2010/0138608 A1 * | 6/2010 | Rappoport | G06F 12/0806 711/123 |
| 2010/0250902 A1 | 9/2010 | Abernathy et al. | |
| 2011/0067034 A1 | 3/2011 | Kawamoto | |
| 2011/0296423 A1 | 12/2011 | Elnozahy et al. | |
| 2012/0054447 A1 * | 3/2012 | Swart | G06F 12/0888 711/136 |
| 2012/0173818 A1 * | 7/2012 | Martin | G06F 12/084 711/118 |
| 2012/0278596 A1 | 11/2012 | Tran et al. | |
| 2012/0303936 A1 | 11/2012 | Tran et al. | |
| 2013/0290639 A1 | 10/2013 | Tran et al. | |
| 2013/0297912 A1 | 11/2013 | Tran et al. | |
| 2013/0297916 A1 | 11/2013 | Suzuki et al. | |
| 2013/0339619 A1 | 12/2013 | Roy | |
| 2014/0047215 A1 | 2/2014 | Ogasawara | |
| 2014/0109098 A1 | 4/2014 | Sato et al. | |
| 2014/0189324 A1 | 7/2014 | Combs et al. | |
| 2014/0372732 A1 | 12/2014 | Fleischman et al. | |
| 2015/0220347 A1 | 8/2015 | Glossner et al. | |
| 2016/0004534 A1 | 1/2016 | Padmanabha et al. | |
| 2016/0246728 A1 | 8/2016 | Ron et al. | |
| 2016/0291982 A1 | 10/2016 | Mizrahi et al. | |
| 2016/0306633 A1 | 10/2016 | Mizrahi et al. | |
| 2017/0046164 A1 | 2/2017 | Madhavan | |
| 2017/0168949 A1 * | 6/2017 | Jackson | G06F 12/0875 |

OTHER PUBLICATIONS

Markovic, N., "Hardware Thread Scheduling Algorithms for Single-ISA Asymmetric CMPs," (2015). (Year: 2015).

* cited by examiner

| Performance of scalar microprocessor | In-order | OOO Improve | |
|---|---|---|---|
| Number of instructions | 100 | 100 | |
| Load instruction frequency | 20% | 20% | |
| Load instructions | 20 | 20 | |
| L1 Data cache miss | 15% | 15% | |
| Load miss | 3 | 3 | |
| 4-bank, data conflict is 25% | | 5% | |
| L2 cache latency | 15 | 15 | |
| Estimate executed instructions after load miss | 4 | 4 | |
| Load miss penalty cycles | 11 | 10.25 | |
| Load miss additional cycles | 33 | 30.75 | |
| Total cycles | 133 | 130.75 | |
| IPC with branch misprediction & load miss | 0.75 | 0.76 | 2% |

MODULIZATION OF CACHE STRUCTURE UTILIZING INDEPENDENT TAG ARRAY AND DATA ARRAY IN MICROPROCESSOR

TECHNICAL FIELD

The present disclosure generally relates to a microprocessor architecture, and specifically relates to modularization of cache structure in the microprocessor.

BACKGROUND

A Level-1 (L1) cache of a microprocessor is commonly implemented as a tightly coupled unit of tag and data arrays. Whether the L1 cache is implemented as a single-port cache array or a dual-port cache array, processes of fetching address and data are tightly coupled. If there is an address or data conflict related to at least two consecutive memory access instructions, then one of the memory access instructions needs to stall in a pipeline causing stalling of one or more following instructions that leads to performance degradation of the L1 cache as well as to performance degradation of a microprocessor where the L1 cache is incorporated. Stalling of instructions due to address and/or data conflict is further undesirable since the effective clock frequency of operating the L1 cache is substantially reduced. In addition, there is a negative performance impact if the tag array is not accessed as early as possible.

A data array of the L1 cache is typically much larger than a tag array. The data array may be, for example, a large compiler memory that typically requires multiple clock cycles (e.g., two clock cycles) for memory access, such as data load/store. Because of the multi-cycle memory access, the data array is typically implemented by using multiple memory banks that can be simultaneously accessed. If, for example, two consecutive memory access instructions request access to two different memory banks, no bank conflict exists and addresses in separate memory banks can be simultaneously accessed without any conflict. On the other hand, if two consecutive memory access instructions request access to the same memory bank (either the same or different data), then a bank conflict exists (e.g., data or address conflict), and one of the memory access instructions (e.g., a later instruction of the two consecutive instructions) needs to be stalled. Since instructions are executed in order, one or more instructions following the stalled instruction can be also stalled, which is undesirable since it negatively affects performance of an L1 cache as well as performance of a microprocessor incorporating the L1 cache. Generally, the multi-cycle access of a data array can cause more bank conflicts than accessing of a smaller tag array.

SUMMARY

Certain embodiments of the present disclosure support implementation of a Level-1 (L1) cache in a microprocessor based on data arrays and tag arrays that are independently accessed. No stall pipeline mechanism is required for L1 cache implementations presented herein since stall of instructions is avoided when there is a memory conflict.

Example embodiments of the present disclosure include configurations that may include structures and processes within a microprocessor. For example, a configuration may include a data array in a cache of the microprocessor interfaced with one or more data index queues, a tag array, and circuitry coupled to the data array and the tag array. The one or more data index queues can store, upon occurrence of a conflict between at least one instruction requesting access to the data array and at least one other instruction that accessed the data array, at least one data index for accessing the data array associated with the at least one instruction. The tag array in the cache is coupled with a tag queue that stores one or more tag entries associated with one or more data outputs read from the data array based on accessing the data array. The circuitry in the cache coupled to the data array and the tag array is configured for independent access of the data array and the tag array.

Example embodiments of the present disclosure include configurations that may include structures and processes within a microprocessor. For example, a configuration may include issuing one or more instructions per clock cycle for accessing a data array in a cache of the microprocessor interfaced with one or more data index queues, keeping, in the one or more data index queues upon occurrence of a conflict between at least one instruction requesting access to the data array and at least one other instruction that accessed the data array, at least one data index for accessing the data array associated with the at least one instruction, accessing, for the at least one instruction and the at least one other instruction, a tag array in the cache interfaced with a tag queue independently of accessing the data array, and storing, in the tag queue based on accessing the tag array, one or more tag entries associated with one or more data outputs read from the data array in response to accessing the data array.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
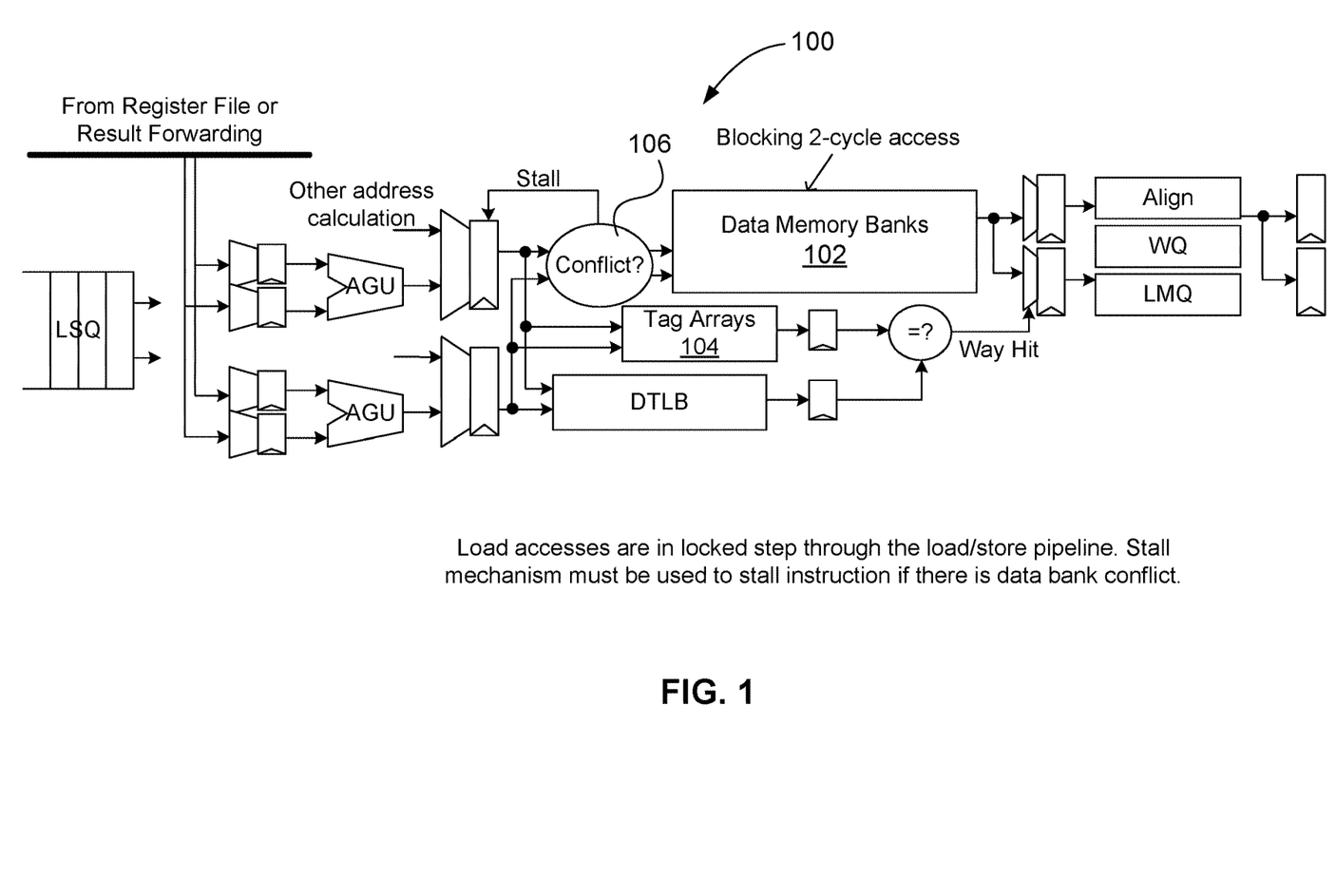
FIG. 1 is an architecture diagram of a Level-1 (L1) cache implemented with tightly coupling of tag and data arrays.

FIG. 1 is an architecture block diagram of a Level-1 (L1) cache 100 with tightly coupling of data and tag arrays, such as data memory banks or a data array 102 and tag arrays 104. As illustrated in FIG. 1, the data array 102 can be implemented as multiple data memory banks, wherein each data memory bank requires multiple clock cycles (e.g., two clock cycles) for memory access, while multiple memory accesses (e.g., two memory accesses) can be performed in parallel during the multi-cycle memory access. A bank conflict may exist when, for example, two consecutive or concurrent memory access instructions (e.g., load accesses) try to access the same memory bank (e.g., the same address index in a memory bank) of the data array 102. A part of the address is typically used as an index to access a specific entry in a data memory bank. As illustrated in FIG. 1, if the bank conflict exists (e.g., determined at block 106), the stall mechanism may be launched in order to stall one of the concurrent memory access instructions (e.g., a later load access) as well as other instruction(s) following the two concurrent memory access instructions. Therefore, at least one load access instructions is in a locked step through a load/store pipeline of the L1 cache 100, as illustrated in FIG. 1.

For certain embodiments, a tag array unit within an L1 cache (e.g., the tag arrays 104 of the L1 cache 100 shown in FIG. 1) can be more critical in terms of performance in relation to tag hit/miss information. Because a tag array unit is substantially smaller than a data array unit, accessing of the tag array unit can be performed in a single cycle, unlike accessing the data array that requires multiple clock cycles. It is therefore beneficial not to penalize operation of a tag array unit in case of a bank conflict related to accessing the data array. Therefore, a tag array unit of an L1 cache may be accessed independently from accessing a data array unit, which may accordingly improve performance. For example, the decision of whether a load instruction can commit may be dependent on a tag hit/miss indication. In accordance with embodiments of the present disclosure, tag and the data arrays of the L1 cache may be implemented as two independent modules. Embodiments of the present disclosure relate to modulization of the L1 cache structure for achieving performance improvement.

Figure 2:
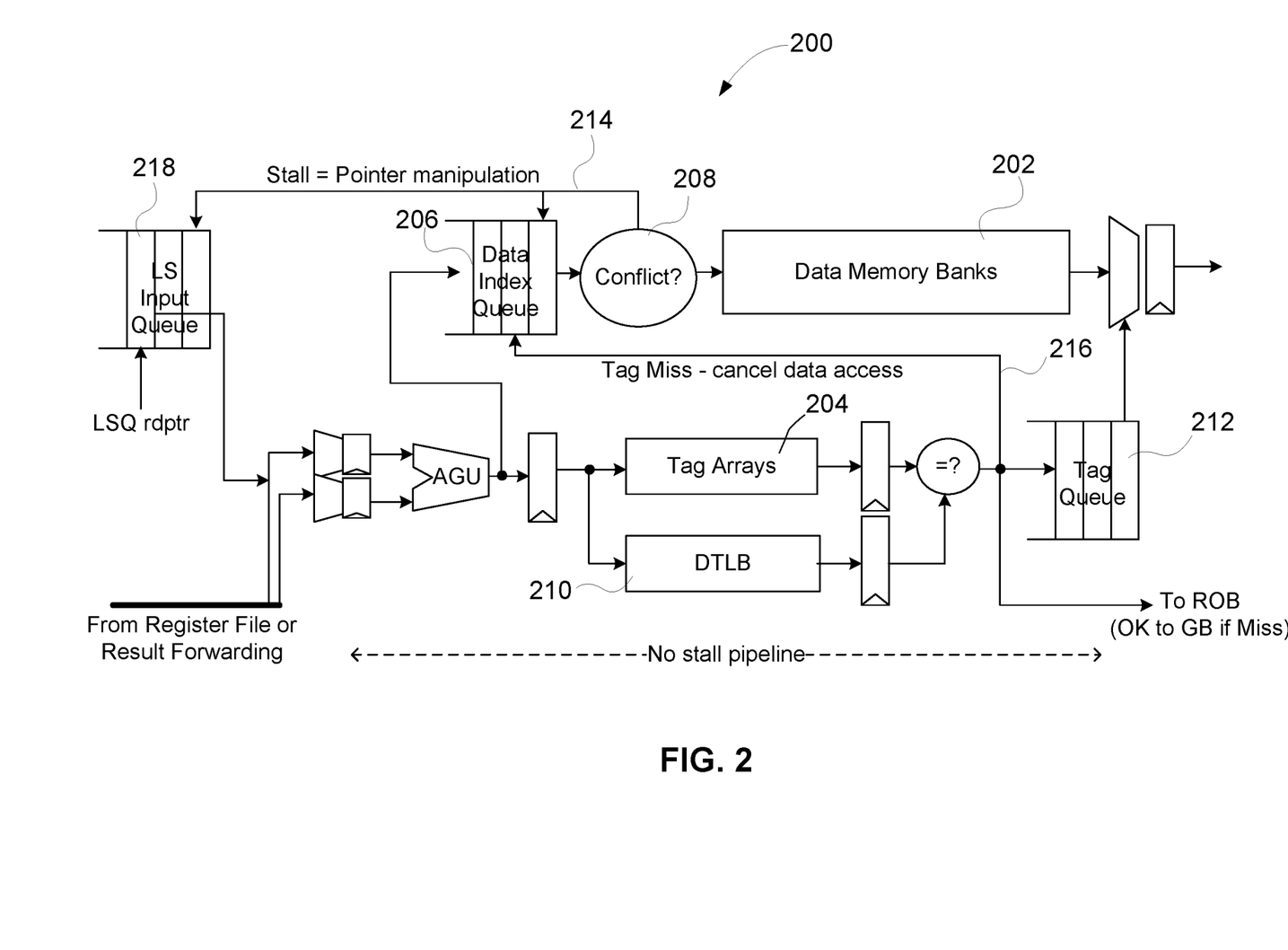
FIG. 2 is an architecture diagram of a single-port L1 cache with tag and data arrays implemented as independent modules, in accordance with example embodiments of the present disclosure.

FIG. 2 is an example architecture block diagram of a single-port L1 cache 200 with independent data and tag array accesses, in accordance with embodiments of the present disclosure. The single-port L1 cache 200 can correspond to instruction cache, data cache, or any other type of cache. As illustrated in FIG. 2, a data array 202 (e.g., data memory banks) and a tag arrays unit 204 of the L1 cache 200 are implemented as two independently accessed modules. The L1 cache 200 may comprise a data index queue 206 associated with the data array 202, wherein the data index queue 206 may store data indexes related to accesses of the data array 202. In one or more embodiments, the data index queue 206 may be configured to keep one or more data indexes associated with one or more accesses of the data array 202 when there is a conflict, which may be detected by an interface circuit 208 coupled to the data index queue 206 and the data array 202.

A data array access (e.g., access of the data array 202) is typically slower than a tag array access (e.g., access of the tag array 204) due to the aforementioned multi-cycle access of large data arrays. The tag arrays 204 as well as a data translation look-aside buffer (DT LB) 210 associated with the tag arrays 204 are substantially smaller than the data array (data memory banks) 202 and may be accessed within a single clock cycle. In one or more embodiments of the present disclosure, as illustrated in FIG. 2, a tag queue 212 may be implemented at an output of the tag arrays 204 and the DTLB 210 for storing tags from the tag arrays 204, wherein each entry in the tag queue 212 is associated with a corresponding data being produced by the data array 202. For example, the first entry in the tag queue 212 may be associated with the first data being produced by the data array 202, the second entry in the tag queue 212 may be associated with the second data being produced by the data array 202, and so on.

For some embodiments, a read pointer 214 of the data index queue 206 may be manipulated (changed) to resend an instruction (e.g., data access) when a conflict is removed, without accessing again the tag arrays 204 and the DTLB 210. In contrast, for the L1 cache implementation based on a stall pipeline (e.g., the L1 cache 100 illustrated in FIG. 1), a stalled instruction must be replayed from a Load/Store (LS) input queue, followed by performing an address generation unit (AGU) operation and again accessing a tag array, which may produce a higher power consumption of the L1 cache with the stall pipeline and of a microprocessor that incorporates this kind of L1 cache.

For some embodiments, in case of a tag miss, if the data index associated with data access is still in the data input queue 206, then this entry (data index) of the data index queue 206 may be invalidated and removed from the data index queue 206 based on tag hit/miss information 216. Hence, in the case of tag miss, accessing of the data array 202 may be cancelled, which may provide lower power consumption of the L1 cache 200. In general, if the corresponding entry in the data index queue 206 is not yet issued to the data array 202, then a specific way of data array accessing and/or tag array accessing can save power consumption of the L1 cache. In some embodiments, information 216 about a translation look-aside buffer (TLB) miss in relation to DTLB 210 can be used to cancel a corresponding entry in the data index queue 206. Then, an instruction with the TLB miss and subsequent instruction(s) may be cancelled and replayed from the LS input queue 218. A microprocessor may attempt to fetch a TLB entry from Level-2 TLB cache (not shown in FIG. 2) and restart the instruction that had the TLB miss from the LS input queue 218 again. On second attempt, the TLB miss becomes an exception so that a software instruction can load the TLB entry from a memory.

For some embodiments, the tag array 204 and the DTLB 210 may be configured to detect tag hit/miss and send the tag hit/miss information 216 to a reorder buffer (ROB), not shown in FIG. 2. ROB may allow a corresponding instruction to be committed earlier leading to improved running performance of a microprocessor. The instruction can be moved from the ROB to a Retire Queue (RQ) when the instruction passes a commit stage without any exception (e.g., in case of the DTLB hit). In an embodiment, the instruction may be moved to a Graduate Buffer (GB) of the RQ if the tag hit/miss information 216 indicates a tag miss.

In accordance with embodiments of the present disclosure, instructions from a Load/Store (LS) input queue 218 may go through into the data index queue 206 and to the tag queue 208 until there is enough space in the data index queue 206 and the tag queue 212. In one or more embodiments, the LS input queue 218 may directly communicate with the tag queue 212 in order to prevent overflowing of the tag queue 212. In one or more embodiments, the interface circuit 208 may control the read pointer 214 and a write pointer (not shown in FIG. 2) of the data index queue 206 (and of the LS input queue 218) based on the detection of the conflict, as discussed in more detail below. In some embodiments, the data index queue 206, the interface circuit 208, the tag queue 212, and the LS input queue 218 may be configured to provide circuitry for independent access of the data array 202 and the tag arrays module 204.

Because of the modulized implementation of the single-port L1 cache 200 illustrated in FIG. 2 that is based on independently accessing the data array module 202 (data memory banks) and the tag arrays module 204, the structure of L1 cache 200 does not include any stall pipeline. The implementation of L1 cache without a stall pipeline presented herein may lead to a higher clock frequency of operating the L1 cache within a microprocessor.

In accordance with embodiments of the present disclosure, as discussed above, an L1 cache (e.g., the single-port L1 cache 200 illustrated in FIG. 2) may be implemented with data and tag arrays as two independently operating modules (e.g., the data array module 202 and the tag arrays module 204 shown in FIG. 2). If there is a bank conflict, a data index associated with a data access may be stored in a data input queue, such as the data index queue 206. An output queue for the tag arrays (e.g., the tag queue 212 shown in FIG. 2) may be implemented having each entry associated with corresponding output data from the data array (e.g., the data array 202). Furthermore, a tag array output (e.g., the tag hit/miss information 216) may be sent directly to an ROB independent of data output result originating from the data array 202. In addition, the tag array output (e.g., the hit/miss information 216) may be also communicated to the data input queue (e.g., the data index queue 206) for invalidation of data access in case of a tag miss.

Figure 3:
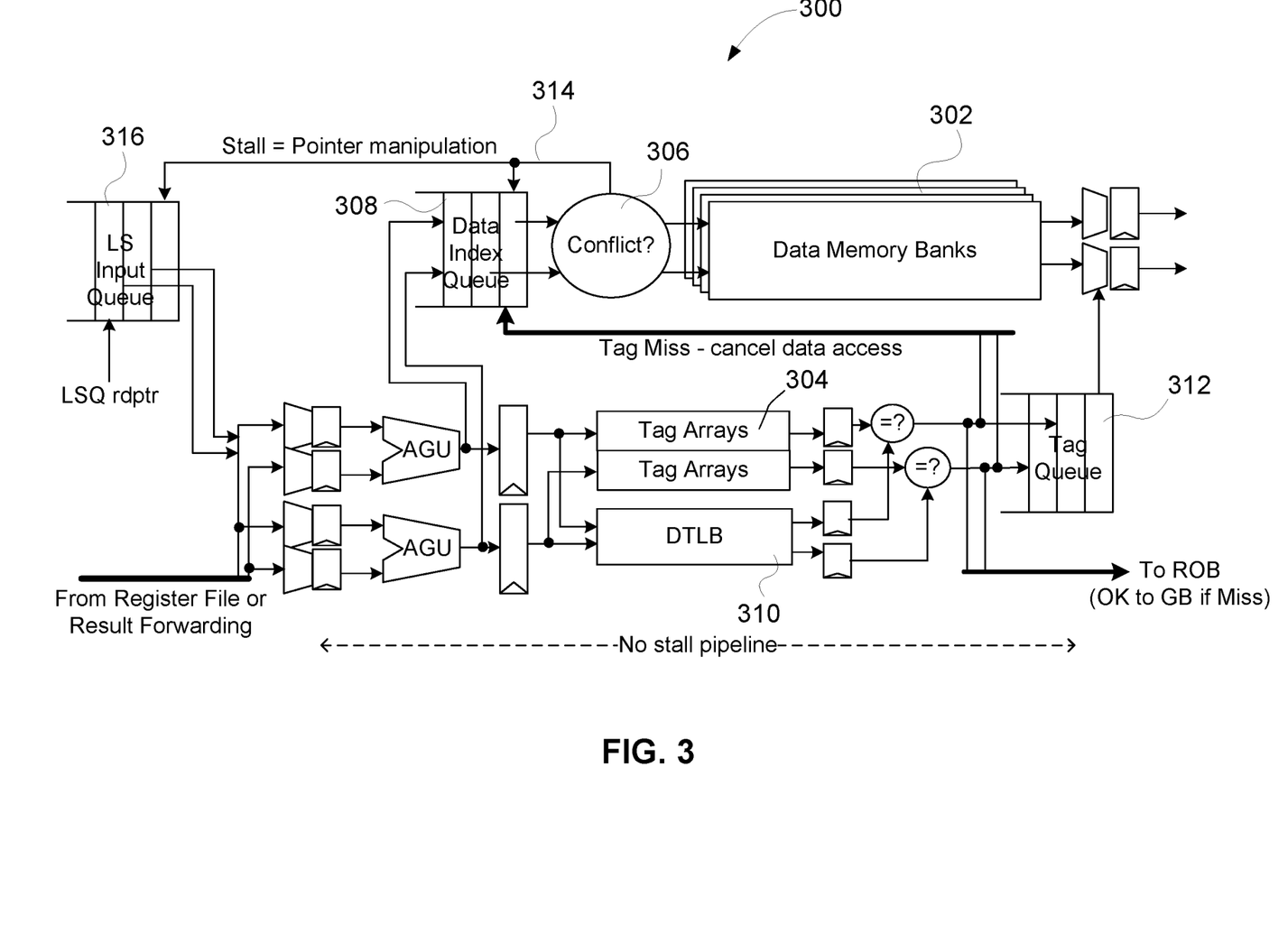
FIG. 3 is an architecture diagram of a dual-port L1 cache with tag and data arrays implemented as independent modules, in accordance with example embodiments of the present disclosure.

FIG. 3 is an architecture block diagram of a dual-port L1 cache 300 with independent data and tag array accesses, in accordance with embodiments of the present disclosure. The dual-port L1 cache 300 can correspond to instruction cache, data cache, or any other type of cache. As illustrated in FIG. 3, a data array 302 (e.g., data memory banks) and tag arrays 304 are implemented as two independently accessed modules. As further illustrated in FIG. 3, the data array 302 (data memory banks) can be implemented as dual-port memory banks for simultaneous access of two addresses in each memory bank. Tag arrays 304 are duplicated relative to the tag arrays 204 of the L1 cache 200 shown in FIG. 2, so as two memory accesses can be performed simultaneously (in parallel), if there is no conflict. An interface circuit 306 coupled to a data index queue 308 and the data array 302 may be configured to detect conflict when accessing the data array 302 based on data indexes from the data index queue 308. DTLB 310 shown in FIG. 3 can be implemented using register-cells, which can inherently have dual ports for two simultaneous accesses, i.e., the DTLB 310 of the dual-port L1 cache 300 is not duplicated relative to the DTLB 210 of the single-port L1 cache 200 illustrated in FIG. 2.

As illustrated in FIG. 3, other components and parts of the dual-port L1 cache 300 are substantially similar as corresponding components and parts of the single-port L1 cache 200 illustrated in FIG. 2. For example, the dual-entry data index queue 308 is included in the dual-port L1 cache 300 for storing data indexes related to accesses of the data array 302; and an appropriate (e.g., dual-entry) tag queue 312 may be implemented at an output of the tag arrays 304 and the DTLB 310 for storing tags from the tag arrays 304, wherein each entry in the tag queue 312 is associated with a corresponding data being produced by the data array 302. In some embodiments, the interface circuit 306 may control read and write pointers 314 of the data index queue 308 (and of an LS input queue 316) based on the detection of the conflict, as discussed in more detail below.

For some embodiments of the present disclosure, a store instruction does not need to access the data array 302 (data memory banks) when the store instruction is issued from a decode unit. Therefore, the store instruction does not have an entry in the data index queue 308. Since there is no stall on any store operation, performance of an L1 cache (e.g., the dual-port L1 cache 300 illustrated in FIG. 3) is improved. In one or more embodiments, data related to the store instruction may be kept in a store buffer. When the data is retired from an ROB, the data related to the store instruction may be allowed to be written from a write buffer to the data array 302 (data memory banks) through the data index queue 308.

Figure 4:
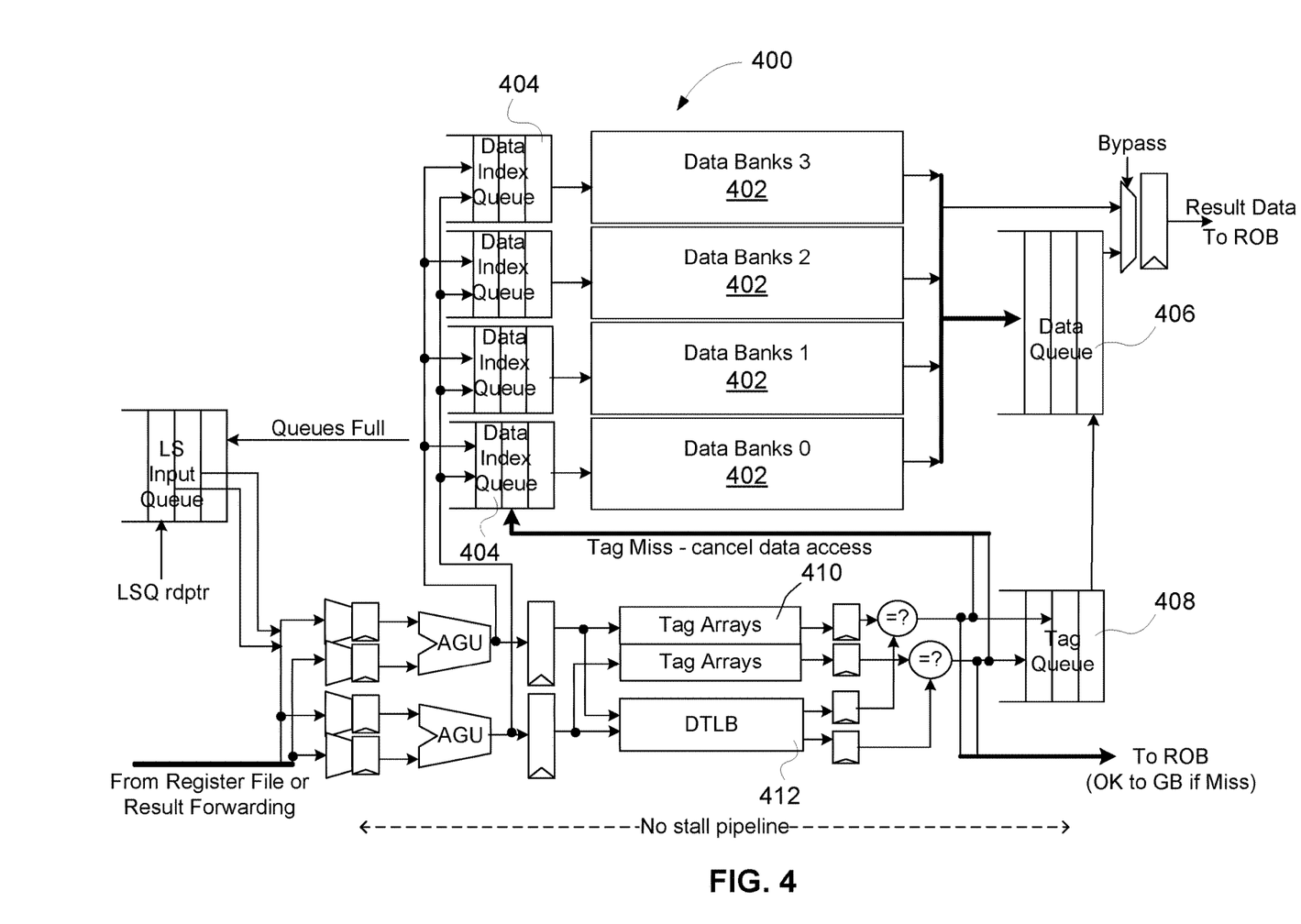
FIG. 4 is an architecture diagram of L1 cache with multiple queues for data banks, in accordance with example embodiments of the present disclosure.

FIG. 4 is an architecture diagram of L1 cache 400 with multiple queues interfaced with data banks, in accordance with embodiments of the present disclosure. The L1 cache 400 can correspond to instruction cache, data cache, or any other type of cache. As illustrated in FIG. 4, each data bank 402 may be interfaced with its own data index queue 404. One data index queue 404 comprises an interface with one of the data banks 402. The interface of the data index queue 404 with the data bank 402 provides independent access from each data index queue 404 into each data bank 402. Each data index queue 404 interfaced with one data bank 402 can be configured to detect based on data indexes in that data index queue 404 if there is a conflict when accessing the data bank 402 interfaced with that data index queue 404. Therefore, no separate circuitry for conflict detection is needed when accessing data banks 402. If a certain data index queue 404 is empty, no bank conflict exists for a corresponding data bank 402, and an instruction request for memory access may access that particular data bank 402 immediately.

In some embodiments, a data output queue 406 associated with all data banks 402 may match entries in a tag output queue 408 that stores tags entries from tag arrays 410 and/or DTLB 412. In one embodiment, in case of returning result data to ROB in-order, a first entry in the data output queue 406 may bypass directly to a result data register and then to ROB. In another embodiment, in case of returning result data to ROB out-of-order, output data from the data banks 402 may be known two cycles early, and any entry with valid result data can bypass to the result data register and then to ROB.

Figure 5:
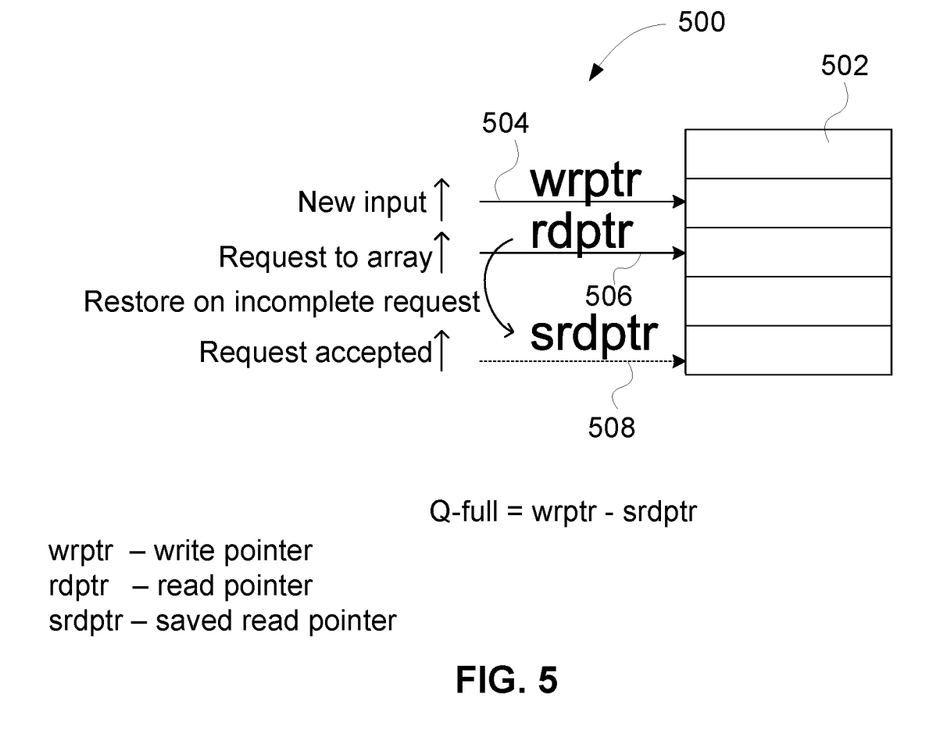
FIG. 5 is an example of pointer manipulation of a data index queue within the single-port L1 cache shown in FIG. 2 and/or within the dual-port L1 cache shown in FIG. 3, in accordance with example embodiments of the present disclosure.

FIG. 5 illustrates an example 500 of pointer manipulation of a data index queue 502 for writing and reading data indexes from/to the data index queue 502, in accordance with embodiments of the present disclosure. In one or more embodiments, the data index queue 502 may correspond to the data index queue 206 of the single-port L1 cache 200 illustrated in FIG. 2. In one or more other embodiments, the data index queue 502 may correspond to the data index queue 308 of the dual port L1 cache 300 shown in FIG. 3. In one or more other embodiments, the data index queue 502 may correspond to the data index queue 404 of multi-port L1 cache 400 shown in FIG. 4. As illustrated in FIG. 5, a write pointer (wrptr) 504 may be separate from a read pointer (rdptr) 506, i.e., a write location of the data index queue 502 may be separate and independent from a read location of the data index queue 502. In some embodiments, the write pointer 504, the read pointer 506, and a saved read pointer (srdptr) 508 used for restoring the read pointer 506 may be controlled by the interface circuit 208 of the single-port L1 cache 200 shown in FIG. 2 and/or by the interface circuit 306 of the dual port L1 cache 300 shown in FIG. 3.

In accordance with embodiments of the present disclosure, if there is a new input (i.e., a new data index) written in the data index queue 502, the new input may be written into a location of the data index queue 502 indicated by the write pointer 504. After that, the write pointer 504 may increment and point to a next write location in the data index queue 502. If an entry (data index) is about to be read from the data index queue 502 since a request to access a data array is sent, the data index may be read from a location of the data index queue 502 indicated by the read pointer 506. The read pointer 506 then increments and moves to a next read location of the data index queue 502, whereas the saved read pointer 508 does not yet increment and still points to a previous read location that was pointed to by the read pointer 506 before the read pointer 506 increments. If the request for data access is incomplete (i.e., if there is a memory bank conflict), the read pointer 506 may be restored based on a value of the saved read pointer 508. If the request for data access is complete (i.e., if there is no memory bank conflict), the saved read pointer 508 also increments. In one or more embodiments, if a difference in number of locations of the data index queue 502 between the write pointer 504 and the saved read pointer 508 is equal to a predefined threshold value (e.g., Q-full), then the data index queue 502 is full and a new data index entry cannot be written into the data index queue 502.

Figure 6:
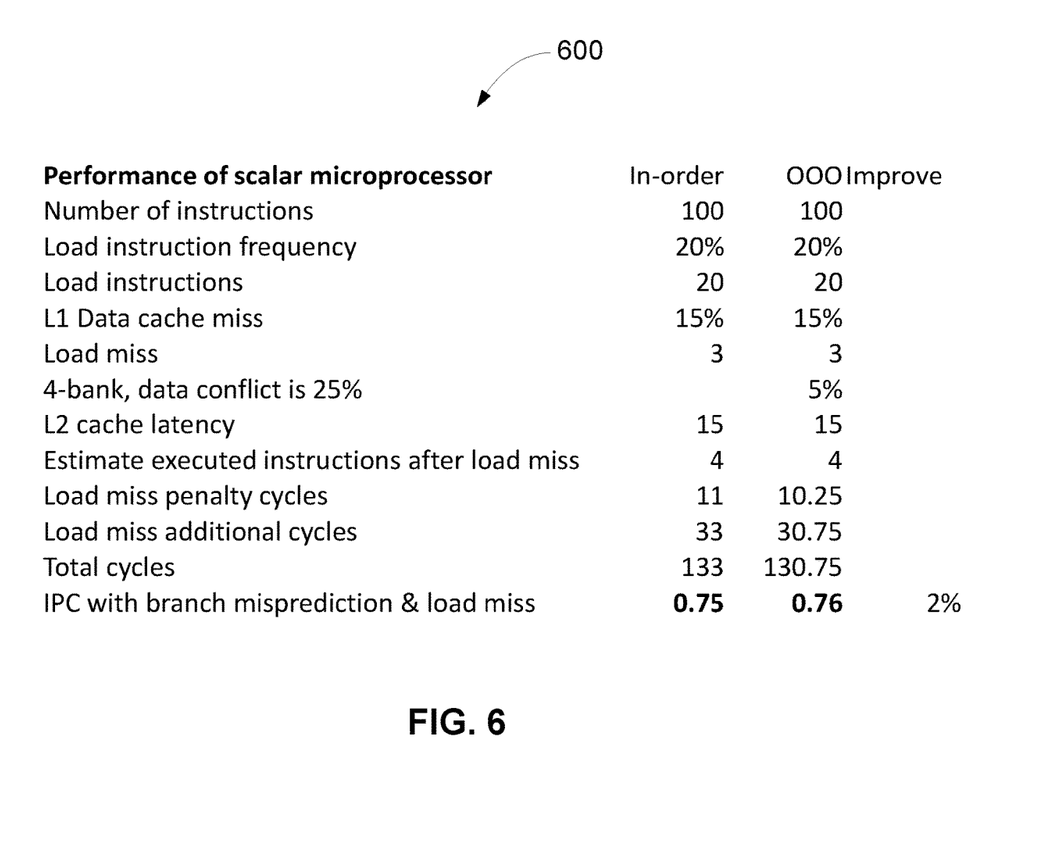
FIG. 6 is a table showing performance improvement of a scalar microprocessor having an L1 cache implemented with independent tag and data array accesses, in accordance with example embodiments of the present disclosure.

FIG. 6 illustrates a table 600 showing performance of a scalar microprocessor with in-order instruction execution and of a microprocessor with out-of-order instruction execution using the modulized L1 cache implementation presented in this disclosure. As shown in FIG. 6, the estimated performance improvement is approximately 2% based on L1 cache miss alone. As discussed above, the achieved saving in power consumption can be related to cancelling access of a data array on a cache miss. As shown in FIG. 6, the estimated power consumption saving is approximately 1.5% for 10% of the L1 cache miss. In addition, the modulized implementation of L1 cache presented in this disclosure is simpler than that of the L1 cache with tightly coupled tag array and data array, since the mechanism for stalling of instructions is not needed and tight coupling of data and tag arrays is avoided.

It should be noted that the performance improvement shown in FIG. 6 relate to operating L1 cache while considering execution of only load instructions. Further improvement can be achieved when considering execution of store instructions, e.g., especially when each load instruction is followed by a store instruction. In the case of L1 cache implementation with a stall pipeline (e.g., the L1 cache 100 illustrated in FIG. 1), because a load instruction stalls, a following store instruction also stalls although the store instruction does not need to access a data array to obtain data. For the modulized L1 cache implementation presented in this disclosure (e.g., the single-port L1 cache 200 illustrated in FIG. 2, the dual-port L1 cache 300 illustrated in FIG. 3, the L1 cache 400 with multiple queues for data banks illustrated in FIG. 4), data and tag arrays are independently accessed, there is no stall pipeline, and both load and store instructions can go through pipeline stages and execute in order.

Figure 7:
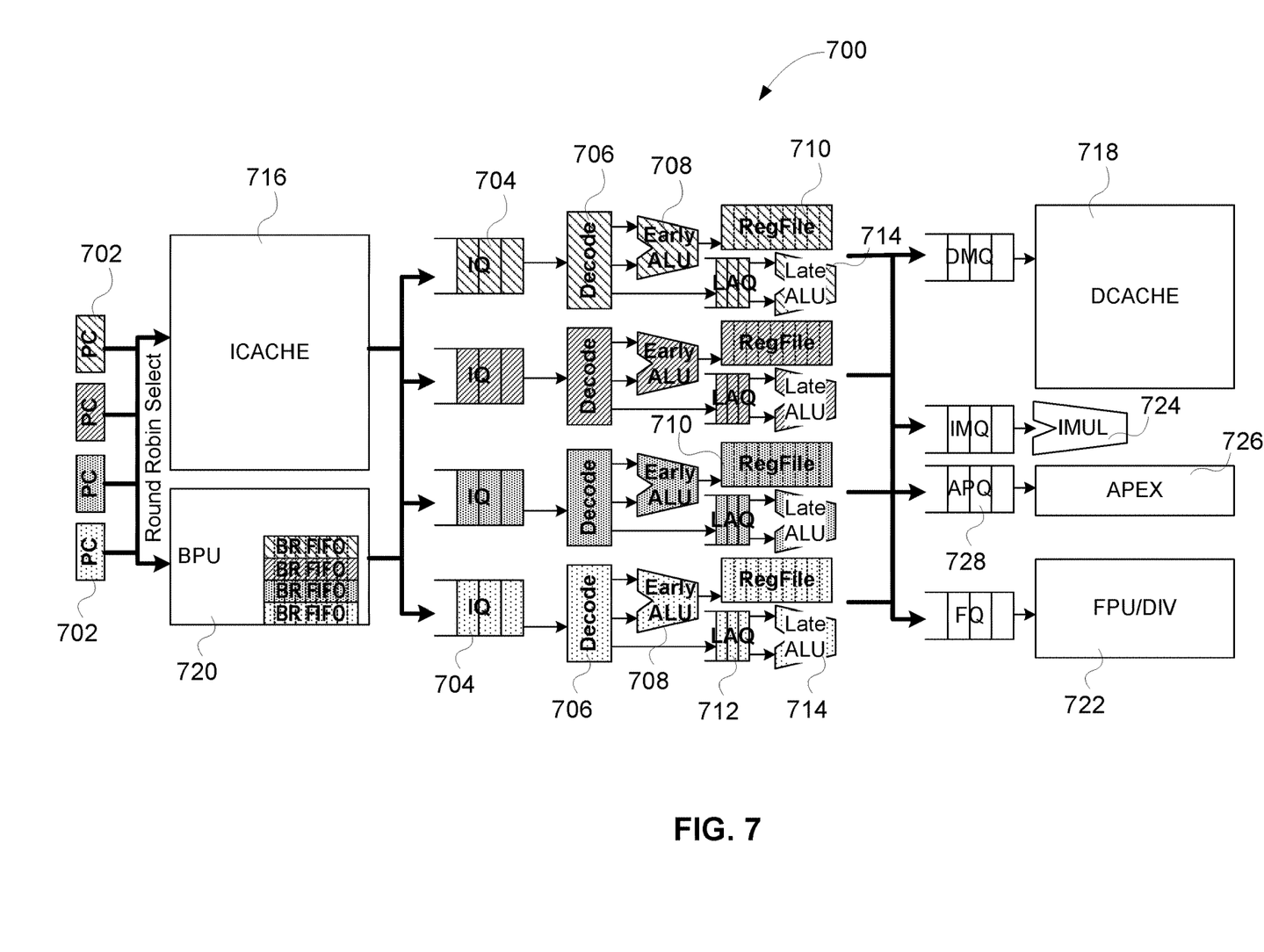
FIG. 7 is an architecture block diagram of a microprocessor comprising implementation of L1 cache illustrated in Figures (FIGS. 2, 3 and 4, in accordance with example embodiments of the present disclosure.

FIG. 7 illustrates an architecture block diagram of a microprocessor 700 with high performance implementation of multi-threading, in which embodiments of the present disclosure can be implemented. The microprocessor 700 may comprise multiple resources dedicated to different threads, such as program counters (PCs) 702 (e.g., selected in a round robin manner), multiple instruction queues (IQs) 704, multiple decode units 706, Early Arithmetic Logic Units (ALUs) 708, register files 710, Late ALU Queues (LAQs) 712 and Late ALUs 714. On the other hand, as illustrated in FIG. 7, certain resources of the microprocessor 700 are not replicated. More expensive resources (e.g., in terms of area size and/or power consumption), such as an instruction cache 716, a data cache 718, branch prediction unit (BPU) 720, and floating point unit (FPU) 722 are not replicated, i.e., they are shared among multiple threads. Furthermore, those infrequently used resources, such as a divide unit (DIV) 722 and an Integer Multiplier (IMUL) unit 724 are also not replicated. In some embodiments, Arc Processor Extension (APEX) unit 726 can be implemented as a customer specific functional unit. In one or more embodiments, APEX unit 726 can comprise independent functional sub-units allocated to the multiple threads. In one or more other embodiments, APEX unit 726 can be defined as a functional unit shared among the multiple threads. In either configuration of APEX unit, an Arc Processor-extension Queue (APQ) interfaced with APEX unit can be defined as a shared resource and implemented as shared APQ 728 illustrated in FIG. 7, or APQ can be implemented as independent APQs (not shown in FIG. 7).

In some embodiments, the instruction cache 716 or the data cache 718 may correspond to the single-port L1 cache 200 illustrated in FIG. 2. In some other embodiments, the instruction cache 716 or the data cache 718 may correspond to the dual-port L1 cache 300 illustrated in FIG. 3. In yet some other embodiments, the instruction cache 716 or the data cache 718 may correspond to the L1 cache 400 with multiple queues for data banks illustrated in FIG. 4.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A microprocessor, comprising:
   a data array in a cache of the microprocessor, the data array directly interfaced with one or more data index queues, wherein:
     upon detection of a conflict between a plurality of instructions issued from an input queue requesting access to the data array, at least one data index associated with at least one of the instructions is stored into the one or more data index queues,
     the at least one data index is kept in the one or more data index queues until after removal of the conflict, and
     upon the removal of the conflict, the data array is accessed based on the at least one data index stored in the one or more data index queues;
   a tag array in the cache accessed by the instructions prior to the detection of the conflict, the tag array interfaced with a tag queue that stores tag entries from the tag array, The tag entries associated with data outputs read from the data array in response to accessing the data array when executing the instruction, the tag entries being kept in the tag queue until after the removal of the conflict, the input queue directly communicating with the tag queue to prevent overflowing of the tag queue when the tag entries associated with the instructions are being kept in the tag queue; and
   circuitry in the cache couple to the data array and the tag array, the circuitry configured, upon the removal of the conflict, to initiate resending the at least one of the instructions from the input queue without re-accessing the tag array and the one or more data index queues for storing the at least one data index.

2. The microprocessor of claim 1, wherein the circuitry comprises:
   an interface circuit coupled with the data array and with at least one of the one or more data index queues to detect occurrence of the conflict; and
   a circuit to store, based on the detection of the conflict, the at least one data index for accessing the data array in the at least one data index queue.

3. The microprocessor of claim 1, wherein the circuitry further comprises:
   a circuit coupled to the tag array configured to detect at least one tag miss, wherein the circuit is further configured to trigger removal of the at least one data index from the one or more data index queues based on information about the at least one tag miss.

4. The microprocessor of claim 1, further comprising:
   a data queue interface with the data array for storing one or more data outputs from the data array.

5. The microprocessor of claim 4, wherein each tag entry of the one or more tag entries in the tag queue stored from the tag array is associated with one data output of the one or more data outputs stored in the data queue from the data array.

6. The microprocessor of claim 1, wherein:
   the data array comprises a plurality of data banks, and
   each data index queue of the one or more data index queues comprises an interface with a different data bank of the plurality of data banks.

7. The microprocessor of claim 1, further comprising:
   a data translation look-aside buffer (DTLB) in the data cache associated with the tag array and accessed independently of the data array; and
   a circuit coupled to the tag array and the DTLB configured to detect at least one tag miss.

8. The microprocessor of claim 1, further comprising:
   a read pointer of a data index queue of the one or more data index queues indicating an entry in the data index queue for requesting access to the data array in relation to the at least one instruction;
   a save read pointer of the data index queue for restoring a value of the read pointer after occurrence of the conflict when accessing the data array in relation to the at least one instruction; and
   a write pointer of the data index queue indicating another entry in the data index queue for requesting access to the data array in relation to another instruction of the plurality of instructions.

9. The microprocessor of claim 1, wherein:
   the at least one instruction is issued concurrently with at least one other instruction of the plurality of instructions, or
   the at least one instruction is issued after the at least one other instruction.

10. A method executed by a microprocessor, comprising:
    issuing, from an input queue, one or more instructions per clock cycle for accessing a data array in a cache of the microprocessor, the data array directly interfaced with one or more data index queues;
    upon detection of a conflict between a plurality of instructions issued from the input queue requesting access to the data array, storing at least one data index associated with at least one of the instructions into the one or more data index queues;
    keeping the at least one data index in the one or more data index queues until after removal of the conflict;
    upon the removal of the conflict, accessing the data array based on the at least one data index stored in the one or more data index queues;
    accessing, by the instructions prior to the detection of the conflict, a tag array in the cache interfaced with a ta queue;
    storing, in the tag queue based on accessing the tag array, tag entries from the tag array, The tag entries associated with data outputs read from the data array in response to accessing the data array when executing the instructions;
    keeping the tag entries in the tag queue until after the removal of the conflict communicating, by the input queue, directly with the tag queue to prevent overflowing of the tag queue when the tag entries associated with the instructions are being kept in the tag queue; and upon the removal of the conflict, resending the at least one of the instructions from the input queue without re-accessing the tag array and the one or more data index queues for storing the at least one data index.

11. The method of claim 10, further comprising:

detecting at least one tag miss based on accessing the tag array; and removing, from the one or more data index queues, the at least one data index based on information about the at least one tag miss.

12. The method of claim 10, further comprising:

directly accessing the data array, if at least one data index queue of the one or more data index queues is empty.

13. The method of claim 10, further comprising:

storing the one or more data outputs from the data array into a data queue interfaced with the data array.

14. The method of claim 13, wherein each tag entry of the one or more tag entries in the tag queue stored from the tag array is associated with one data output of one or more data outputs stored in the data queue from the data array.

15. The method of claim 10, further comprising:

incrementing a read pointer of a data index queue of the one or more data index queues based on the at least one instruction requesting access to the array, the read pointer indicating an entry in the data index queue for requesting access to the data array in relation to the at least one instruction;

incrementing, if no conflict occurs when accessing the data array in relation to the at least one instruction, a save read pointer of the data index queue;

restoring, if the conflict occurs when accessing the data array in relation to the at least one instruction, the read pointer based on a value of the save read pointer; and incrementing, based on issuing an instruction of the plurality of instructions for accessing the data array, a write pointer of the data index queue indicating another entry in the data index queue for requesting access to the data array in relation to the instruction.

16. The method of claim 15, further comprising:

triggering indication that the data index is full when the write pointer is same as the save read pointer.

17. The method of claim 10, further comprising:

replaying the at least one instruction based on the at least one data index kept in the one or more data index queue when the conflict is removed.

18. The method of claim 10, wherein issuing the one or more instructions per clock cycle comprises:

issuing the at least one instruction concurrently with issuing at least one other instruction of the plurality of instructions.

19. The method of claim 10, wherein issuing the one or more instructions per clock cycle comprises:

issuing the at least one instruction after issuing at least one other instruction of the plurality of instructions.

* * * * *

UNITED STATES PATENT AND TRADEMARK OFFICE
CERTIFICATE OF CORRECTION

PATENT NO. : 10,628,320 B2
APPLICATION NO. : 15/172906
DATED : April 21, 2020
INVENTOR(S) : Thang Tran It is certified that error appears in the above-identified patent and that said Letters Patent is hereby corrected as shown below:

In the Claims

Column 9, Claim 1, Line 42, delete "array, The" and insert --array, the--.
Column 9, Claim 1, Line 44, delete "instruction" and insert --instructions--.
Column 9, Claim 1, Line 50, delete "couple" and insert --coupled--.
Column 10, Claim 4, Line 6, delete "interface" and insert --interfaced--.
Column 10, Claim 10, Line 59, delete "with a ta" and insert --with a tag--.
Column 10, Claim 10, Line 62, delete "array, The" and insert --array, the--.
Column 10, Claim 10, Line 67, delete "conflict communicating, by the input" and insert --conflict;--.
Column 11, Claim 10, Line 1, before "queue", insert as a new paragraph --communicating, by the input"--.

Signed and Sealed this
Third Day of November, 2020

Andrei Iancu
*Director of the United States Patent and Trademark Office*